US012522285B2

(12) United States Patent
Kakimoto et al.

(10) Patent No.: US 12,522,285 B2
(45) Date of Patent: Jan. 13, 2026

(54) STEERING DEVICE

(71) Applicant: JTEKT CORPORATION, Kariya (JP)

(72) Inventors: Yusuke Kakimoto, Okazaki (JP); Yoshiyuki Uchino, Okazaki (JP); Kenji Shibata, Nagoya (JP); Takafumi Sato, Kariya (JP)

(73) Assignee: JTEKT CORPORATION, Kariya (JP)

( * ) Notice: Subject to any disclaimer, the term of this patent is extended or adjusted under 35 U.S.C. 154(b) by 185 days.

(21) Appl. No.: 18/200,140

(22) Filed: May 22, 2023

(65) Prior Publication Data
US 2023/0294761 A1    Sep. 21, 2023

Related U.S. Application Data

(62) Division of application No. 17/340,779, filed on Jun. 7, 2021, now Pat. No. 11,814,121.

(30) Foreign Application Priority Data

Jun. 18, 2020    (JP) .................................. 2020-105194

(51) Int. Cl.
*B62D 6/00*    (2006.01)
*B62D 5/00*    (2006.01)
(Continued)

(52) U.S. Cl.
CPC ............. *B62D 6/008* (2013.01); *B62D 5/001* (2013.01); *B62D 5/006* (2013.01); *B62D 5/0457* (2013.01); *B62D 15/0245* (2013.01)

(58) Field of Classification Search
CPC ...... B62D 5/001; B62D 5/006; B62D 5/0457; B62D 5/046; B62D 5/0466; B62D 5/0469; B62D 15/0205
See application file for complete search history.

(56) References Cited

U.S. PATENT DOCUMENTS 5,465,210 A * 11/1995 Walenty ............. B62D 15/0245
                                                          701/1
2004/0138796 A1* 7/2004 Yao ......................... B62D 5/006
                                                          180/443
(Continued)

FOREIGN PATENT DOCUMENTS

DE    10 2005 053 902 B4    6/2017
DE    102017201209 A1 *    7/2018
(Continued)

OTHER PUBLICATIONS

Nov. 25, 2021 Extended Search Report issued in European Patent Application No. 21178331.1.
(Continued)

*Primary Examiner* — John M Zaleskas
(74) *Attorney, Agent, or Firm* — Oliff PLC (57) ABSTRACT

A steering device includes a steering shaft, a motor, a stopper mechanism, and a controller. The controller is configured to execute a first process and a second process when a determined condition is established. The first process includes causing the steering wheel to operate to a first operation end through control of the motor and thereafter operate in reverse to a second operation end. The second process includes computing a neutral position of the steering wheel based on a rotational angle of the motor at a time when reverse operation of the steering wheel is started and at a time when the reverse operation of the steering wheel is ended.

17 Claims, 4 Drawing Sheets

(51) Int. Cl.
  *B62D 5/04* (2006.01)
  *B62D 15/02* (2006.01)

(56) References Cited

U.S. PATENT DOCUMENTS

| | | | | |
|---|---|---|---|---|
| 2012/0061171 | A1* | 3/2012 | Ellis | B62D 1/10 |
| | | | | 180/443 |
| 2013/0054074 | A1* | 2/2013 | Schreiber | B62D 15/0245 |
| | | | | 701/23 |
| 2013/0124043 | A1* | 5/2013 | Degenstein | B62D 15/02 |
| | | | | 701/41 |
| 2016/0194028 | A1* | 7/2016 | Choi | B62D 6/002 |
| | | | | 701/41 |
| 2017/0197654 | A1* | 7/2017 | Kim | B62D 5/0463 |
| 2018/0141584 | A1* | 5/2018 | El Aile | B62D 5/0433 |
| 2018/0237062 | A1* | 8/2018 | Saal | B62D 5/0469 |
| 2018/0319425 | A1* | 11/2018 | Swieter | B62D 15/021 |
| 2018/0346018 | A1* | 12/2018 | Kataoka | B62D 5/0463 |
| 2019/0300052 | A1* | 10/2019 | Allan | B62D 15/0245 |
| 2019/0389503 | A1* | 12/2019 | Hwang | B62D 6/008 |
| 2020/0086911 | A1* | 3/2020 | Stahl | B62D 6/002 |
| 2020/0277004 | A1* | 9/2020 | Zheng | B62D 5/0463 |
| 2020/0298901 | A1* | 9/2020 | Anraku | B62D 5/0421 |
| 2021/0009202 | A1* | 1/2021 | Suzuki | B62D 6/002 |
| 2021/0094608 | A1* | 4/2021 | Toko | B62D 5/0409 |
| 2021/0094609 | A1* | 4/2021 | Toko | B62D 5/0469 |
| 2021/0094610 | A1* | 4/2021 | Yamaguchi | B62D 5/0469 |
| 2021/0347411 | A1* | 11/2021 | Roat | B62D 5/005 |
| 2021/0354750 | A1* | 11/2021 | Kim | B62D 5/006 |
| 2021/0371007 | A1* | 12/2021 | Collier-Hallman | B62D 6/002 |
| 2021/0394820 | A1* | 12/2021 | Kakimoto | B62D 15/0205 |
| 2021/0394824 | A1* | 12/2021 | Kakimoto | B62D 5/001 |
| 2021/0394825 | A1* | 12/2021 | Kakimoto | B62D 15/0205 |
| 2021/0394826 | A1* | 12/2021 | Kakimoto | B62D 6/008 |
| 2023/0130338 | A1* | 4/2023 | Strecker | B62D 5/0421 |
| | | | | 701/41 |
| 2023/0234637 | A1* | 7/2023 | Miyakawa | B62D 6/00 |
| | | | | 180/402 |

FOREIGN PATENT DOCUMENTS

| | | |
|---|---|---|
| DE | 10 2019 210 382 A1 | 2/2020 |
| EP | 3 409 562 A1 | 12/2018 |
| GB | 2575994 A | 2/2020 |
| JP | 2004-058745 A | 2/2004 |
| JP | 2006-347209 A | 12/2006 |
| JP | 2007-230275 A | 9/2007 |
| JP | 2013-252804 A | 12/2013 |

OTHER PUBLICATIONS

Jul. 25, 2023 Office Action issued in Japanese Patent Application No. 2020-105194.
Nov. 21, 2023 Office Action issued in Japanese Patent Application No. 2023-096251.

* cited by examiner

FIG. 4C (TRUE MIDPOINT $\theta_{s0}$)

STEERING DEVICE

CROSS-REFERENCE TO RELATED APPLICATION

This application is a divisional of U.S. application Ser. No. 17/340,779 filed Jun. 7, 2021, which claims the benefit of Japanese Patent Application No. 2020-105194 filed on Jun. 18, 2020, incorporated herein by reference in its entirety.

BACKGROUND

1. Technical Field

The present disclosure relates to a steer-by-wire steering device.

2. Description of Related Art

A so-called steer-by-wire steering device in which a steering wheel and steered wheels are separated in terms of power transfer is provided. Japanese Unexamined Patent Application Publication No. 2013-252804 (JP 2013-252804 A), for example, provides a steering device that includes a reaction force mechanism that has a reaction force motor that serves as a generation source of a steering reaction force to be applied to a steering shaft, and a steering mechanism that has a steering motor that serves as a generation source of a steering force for steering steered wheels. When a vehicle travels, a controller for the steering device generates a steering reaction force through power supply control for the reaction force motor, and steers the steered wheels through power supply control for the steering motor.

SUMMARY

In the steering device according to JP 2013-252804 A, the steering motor is controlled based on the steering angle of the steering wheel. The steering device also has a stopper member for providing a limit to the steering angle of the steering wheel. Therefore, in order to maintain the positional relationship between the steering wheel and the steered wheels so as to match a predetermined steering angle ratio, it is necessary that the steering wheel and the steered wheels should operate with the neutral position of the steering wheel and the neutral position of the steered wheels coinciding with each other.

Steering angle midpoint information, which corresponds to the neutral position of the steering wheel, is stored in the controller when the steering device is assembled, for example. The steering angle midpoint information stored in the controller is occasionally erased when a battery is removed from the vehicle when battery replacement work is performed, for example. In this case, it is necessary to store steering angle midpoint information in the controller again after the battery replacement work is completed.

The present disclosure allows obtaining the neutral position of a steering wheel.

An aspect of the present disclosure provides a steering device including: a steering shaft configured to rotate in conjunction with an operation of a steering wheel, the steering shaft being separated from steered wheels of a vehicle in terms of power transfer; a motor configured to generate a steering reaction force that is torque in an opposite direction of a direction of steering applied to the steering shaft; a stopper mechanism configured to restrict rotation of the steering wheel; and a controller configured to control power supply to the motor. The controller is configured to execute a first process and a second process when a determined condition is established. The first process includes causing the steering wheel to operate to a first operation end through control of the motor and thereafter operate in reverse to a second operation end. The second process includes computing a neutral position of the steering wheel based on a rotational angle of the motor at a time when reverse operation of the steering wheel is started and at a time when the reverse operation of the steering wheel is ended.

With the configuration described above, the neutral position of the steering wheel can be obtained when the determined condition is established.

In the steering device described above, the determined condition may include a transition being made from a state in which a vehicle power source is lost to a state in which the vehicle power source is provided, and a power source switch of the vehicle being switched from off to on for a first time after the vehicle power source is provided.

With the configuration described above, the neutral position of the steering wheel can be obtained before operation of the vehicle is started when a transition is made from a state in which the vehicle power source is lost to a state in which the vehicle power source is provided.

In the steering device described above, the controller may be configured to set a target steering angle to an angle that is equal to or more than a limit value of an operation range of the steering wheel determined by the stopper mechanism at a predetermined timing when the first process is executed, the target steering angle being a target value for a steering angle of the steering wheel, and configured to control the motor such that a steering angle computed based on the rotational angle of the motor follows the target steering angle. The predetermined timing may be when the steering wheel is caused to operate to the first operation end and when the steering wheel is caused to operate in reverse from the first operation end to the second operation end.

With the configuration described above, the steering wheel can be operated to the first operation end and the second operation end more reliably when the first process is executed.

In the steering device described above, the controller may be configured to indicate through an in-vehicle informing device that execution of the first process is started, before the execution of the first process is started, when the determined condition is established.

With the configuration described above, the driver is informed that execution of the first process is started before the execution of the first process is started. Therefore, it is possible to reduce an uncomfortable feeling given to the driver even if the steering wheel is rotated through execution of the first process.

With the configuration described above, the neutral position of the steering wheel can be obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
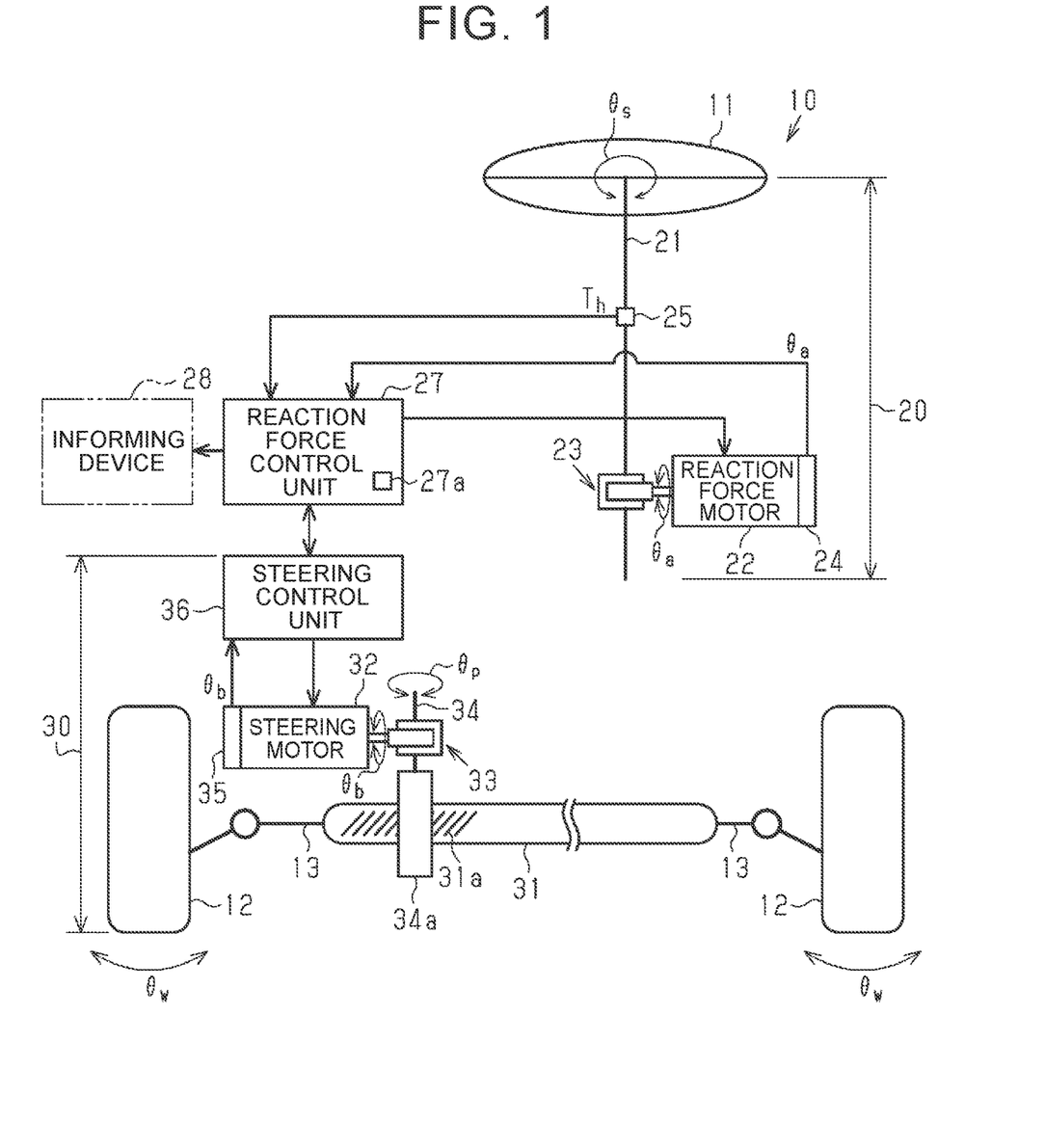
FIG. 1 illustrates the configuration of a steering device according to an embodiment.

A steering device according to an embodiment will be described below. As illustrated in FIG. 1, a steering device 10 of a vehicle has a reaction force unit 20 that applies a steering reaction force to a steering wheel 11 of the vehicle, and a steering unit 30 that steers steered wheels 12, 12 of the vehicle. The steering reaction force refers to torque that acts in the opposite direction of the direction of an operation of the steering wheel 11 performed by a driver. The driver can be given a moderate response by applying the steering reaction force to the steering wheel 11.

The reaction force unit 20 has a steering shaft 21 to which the steering wheel 11 is coupled, a reaction force motor 22, a speed reduction mechanism 23, a rotational angle sensor 24, a torque sensor 25, and a reaction force control unit 27.

The reaction force motor 22 is a generation source of the steering reaction force. The reaction force motor 22 may be a three-phase brushless motor, for example. The reaction force motor 22 is coupled to the steering shaft 21 via the speed reduction mechanism 23. Torque generated by the reaction force motor 22 is applied to the steering shaft 21 as a steering reaction force.

The rotational angle sensor 24 is provided to the reaction force motor 22. The rotational angle sensor 24 detects a rotational angle $\theta_a$ of the reaction force motor 22. The torque sensor 25 is provided on a portion of the steering shaft 21 between the speed reduction mechanism 23 and the steering wheel 11. The torque sensor 25 detects steering torque $T_h$ applied to the steering shaft 21 through an operation to rotate the steering wheel 11.

The reaction force control unit 27 computes a steering angle $\theta_s$, which is the rotational angle of the steering shaft 21, based on the rotational angle $\theta_a$ of the reaction force motor 22 which is detected by the rotational angle sensor 24. The reaction force control unit 27 counts the number of rotations with reference to the rotational angle $\theta_a$ (hereinafter referred to as a "motor midpoint") of the reaction force motor 22 corresponding to the steering neutral position of the steering wheel 11. The reaction force control unit 27 computes the steering angle $\theta_s$ of the steering wheel 11 by computing an integral angle which is an angle obtained by integrating the rotational angle $\theta_a$ using the motor midpoint as the origin, and multiplying the computed integral angle by a conversion coefficient based on the rotational speed ratio of the speed reduction mechanism 23. The motor midpoint is stored in the reaction force control unit 27 as steering angle midpoint information.

When a power source switch of the vehicle is turned off, the reaction force control unit 27 stores the value of the steering angle $\theta_s$ immediately therebefore. In addition, the reaction force control unit 27 detects the amount of rotation (number of rotations) of the reaction force motor 22 during a period for which the power source switch of the vehicle is turned off when a battery is connected. When the power source switched is switched from off to on, the reaction force control unit 27 computes a correct steering angle $\theta_s$ by correcting the steering angle $\theta_s$ immediately before power supply to the reaction force control unit 27 is blocked using the amount of rotation of the reaction force motor 22 which is detected during a period for which the power source switch is turned off.

The reaction force control unit 27 executes reaction force control for generating a steering reaction force that matches the steering torque $T_h$ through drive control for the reaction force motor 22. The reaction force control unit 27 computes a target steering reaction force based on the steering torque $T_h$ which is detected by the torque sensor 25, and computes a target steering angle for the steering wheel 11 based on the computed target steering reaction force and the steering torque $T_h$. The reaction force control unit 27 calculates the difference between the steering angle $\theta_s$, which is computed based on the rotational angle $\theta_a$ of the reaction force motor 22, and the target steering angle, and controls power supply to the reaction force motor 22 so as to eliminate such a difference. The reaction force control unit 27 performs vector control on the reaction force motor 22 using the rotational angle $\theta_a$ of the reaction force motor 22 which is detected by the rotational angle sensor 24.

The steering unit 30 has a steered shaft 31, a steering motor 32, a speed reduction mechanism 33, a pinion shaft 34, a rotational angle sensor 35, and a steering control unit 36. The steered shaft 31 extends along the vehicle-width direction (right-left direction in FIG. 1). Right and left steered wheels 12, 12 are coupled to both ends of the steered shaft 31 via respective tie rods 13, 13.

The steering motor 32 is a generation source of a steering force. The steering motor 32 may be a three-phase brushless motor, for example. The steering motor 32 is coupled to the pinion shaft 34 via the speed reduction mechanism 33. Pinion teeth 34a of the pinion shaft 34 are meshed with rack teeth 31a of the steered shaft 31. Torque generated by the steering motor 32 is applied to the steered shaft 31 via the pinion shaft 34 as a steering force. The steered shaft 31 is moved along the vehicle-width direction (right-left direction in FIG. 1) in accordance with rotation of the steering motor 32. A steered angle $\theta_w$ of the steered wheels 12, 12 is changed as the steered shaft 31 is moved.

The rotational angle sensor 35 is provided to the steering motor 32. The rotational angle sensor 35 detects a rotational angle $\theta_b$ of the steering motor 32. The steering control unit 36 executes steering control for steering the steered wheels 12, 12 in accordance with the steering state through drive control for the steering motor 32. The steering control unit 36 computes a rotational angle $\theta_p$ of the pinion shaft 34 based on the rotational angle $\theta_b$ of the steering motor 32 which is detected by the rotational angle sensor 35. In addition, the steering control unit 36 computes a target rotational angle for the pinion shaft 34 using the target steering angle which is computed by the reaction force control unit 27. The target rotational angle for the pinion shaft 34 is computed based on the viewpoint of achieving a predetermined steering angle ratio. The steering control unit 36 calculates the difference between the target rotational angle for the pinion shaft 34 and the actual rotational angle $\theta_p$, and controls power supply to the steering motor 32 so as to eliminate such a difference. The steering control unit 36 performs vector control on the steering motor 32 using the rotational angle $\theta_b$ of the steering motor 32 which is detected by the rotational angle sensor 35.

Stopper Mechanism

Figure 2:
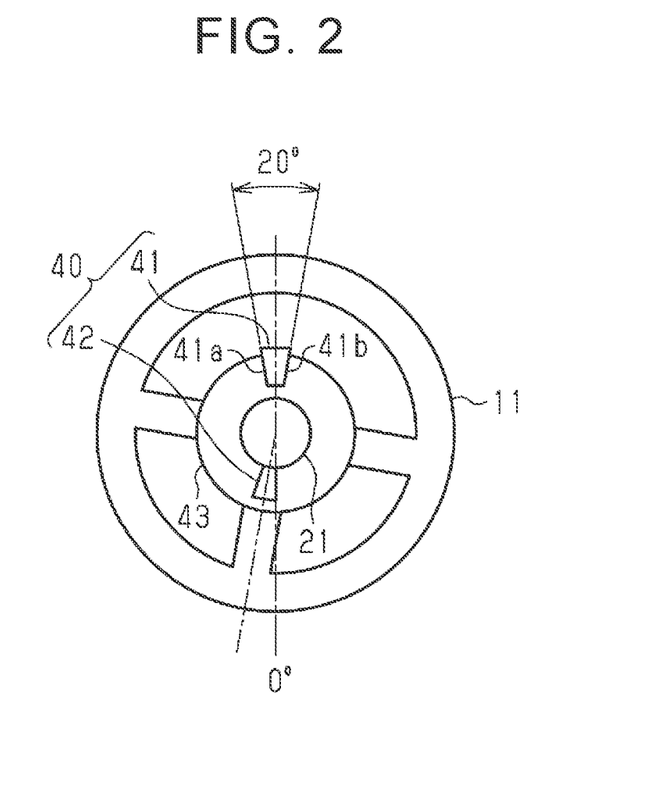
FIG. 2 is a back view of a steering wheel according to the embodiment.

As illustrated in FIG. 2, the reaction force unit 20 has a stopper mechanism 40. The stopper mechanism 40 provides a limit to the steering angle $\theta_s$ of the steering wheel 11. The stopper mechanism 40 restricts rotation of the steering wheel 11 exceeding one rotation (360°). FIG. 2 illustrates the steering wheel 11 as seen from the back side.

The stopper mechanism 40 has a first restriction member 41 and a second restriction member 42. The first restriction member 41 is fixed to a steering column 43 that supports the steering shaft 21 on the vehicle body. The first restriction member 41 extends along the radial direction of the steering shaft 21. The first restriction member 41 has a first restriction surface 41a and a second restriction surface 41b positioned on the opposite sides of each other in the rotational direction of the steering shaft 21. The first restriction surface 41a and the second restriction surface 41b are inclined so as to be proximate to each other toward the steering shaft 21 in the radial direction of the steering shaft 21. The first restriction member 41 is provided in correspondence with the neutral position (steering angle $\theta_s$=0°) of the steering wheel 11.

The second restriction member 42 is fixed to the outer peripheral surface of the steering shaft 21. The second restriction member 42 is positioned in the vicinity of an end portion of the steering shaft 21 on the side of the steering wheel 11. The second restriction member 42 extends along a direction that is orthogonal to the central axis of rotation of the steering shaft 21. The second restriction member 42 can abut against the first restriction member 41 in the rotational direction of the steering shaft 21. Thus, the steering wheel 11 is moved between a first restriction position, at which the second restriction member 42 abuts against the first restriction surface 41a of the first restriction member 41, and a second restriction position, at which the second restriction member 42 abuts against the second restriction surface 41b of the first restriction member 41.

When the angle between the first restriction surface 41a and the second restriction surface 41b is set to 20°, for example, the second restriction member 42 abuts against the first restriction surface 41a of the first restriction member 41 at the timing when the steering wheel 11 is rotated in the left steering direction (clockwise direction in FIG. 2) by 170° with the neutral position of the steering wheel 11 as the start point. The second restriction member 42 abuts against the second restriction surface 41b of the first restriction member 41 at the timing when the steering wheel 11 is rotated in the right steering direction (counterclockwise direction in FIG. 2) by 170° with the neutral position of the steering wheel 11 as the start point. That is, the operation range of the steering wheel 11 is limited to the range of ±170° with reference to the neutral position of the steering wheel 11, or a total of 340°.

The positional relationship between the steering wheel 11 and the steered wheels 12, 12 is maintained so as to match the determined steering angle ratio. For example, when the steering wheel 11 is operated over the entire operation range, the steered wheels 12, 12 are also steered over the entire steering range. Here, the operation range of the steering wheel 11 is limited to the range of less than 360°, and therefore the steered wheels 12, 12 can be steered over the entire steering range without causing the steering wheel 11 to make one rotation. That is, it is not necessary to change a grip on the steering wheel 11.

Here, power is not supplied to the reaction force control unit 27 when the battery is removed from the vehicle when battery replacement work is performed, for example. Therefore, the steering angle midpoint information which is stored in the reaction force control unit 27 is lost. Thus, the reaction force control unit 27 sets steering angle midpoint information again when the power source switch is turned on for the first time after a new battery is attached.

Next, the procedure of a steering angle midpoint setting process performed by the reaction force control unit 27 will be described with reference to the flowchart in FIG. 3. Execution of the process in the flowchart is started when a determined execution start condition is established. The execution start condition includes a transition being made from a state in which a vehicle power source is lost to a state in which the vehicle power source is provided, such as when battery replacement work is completed, and the power source switch being switched from off to on for the first time after the vehicle power source is provided.

The steering angle $\theta_s$ has a negative value when the steering wheel 11 is rotated in the left steering direction with reference to the neutral position, and has a positive value when the steering wheel 11 is rotated in the right steering direction. The operation range of the steering wheel 11 is limited within the range of ±170° with reference to the neutral position by the stopper mechanism 40.

Figure 3:
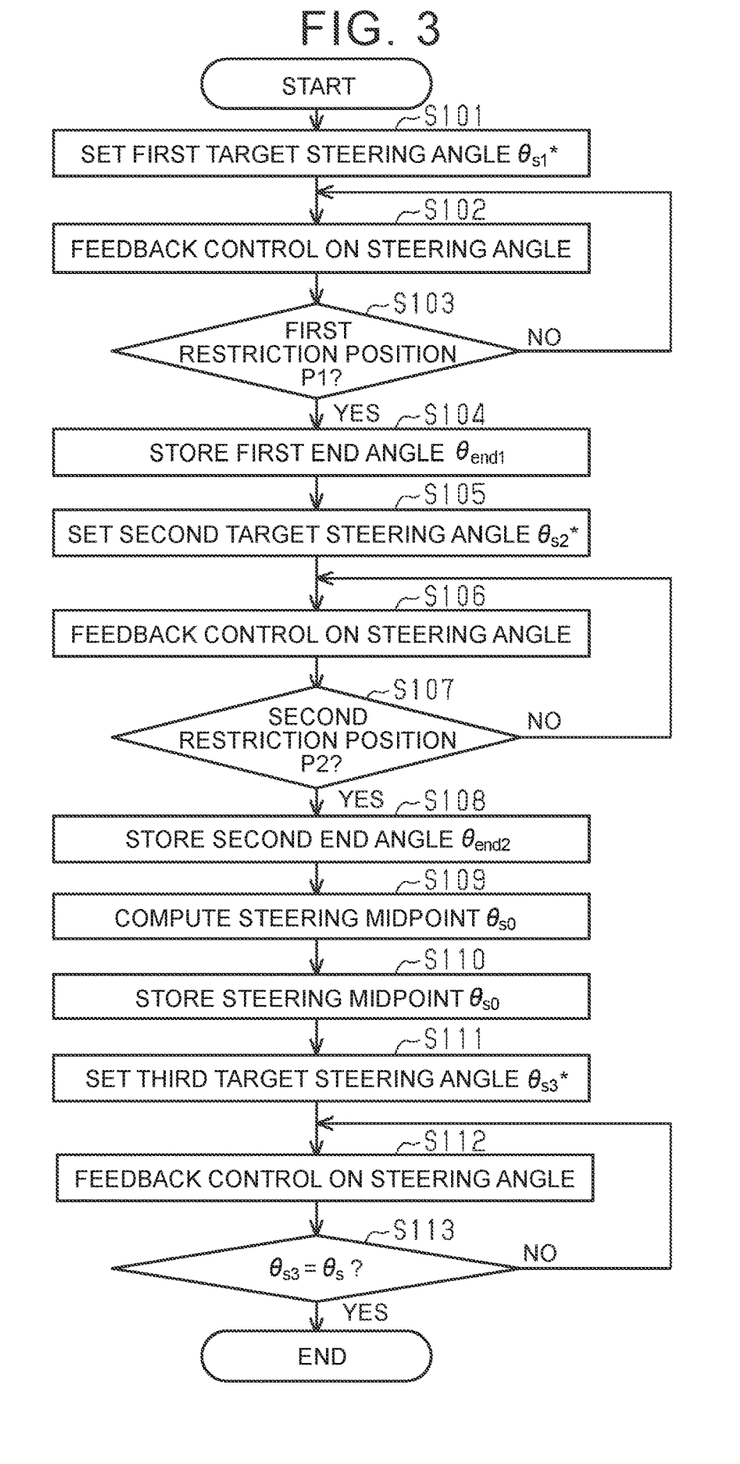
FIG. 3 is a flowchart illustrating the procedure of a steering wheel reference point detection process according to the embodiment.

As indicated in the flowchart in FIG. 3, the reaction force control unit 27 sets a first target steering angle $\theta_{s1}^*$ in order to rotate the steering wheel 11 leftward (step S101). The reaction force control unit 27 computes the present steering angle $\theta_s$ as the initial position of the steering wheel 11 based on the rotational angle $\theta_a$ of the reaction force motor 22 at the time when the power source switch is turned on, and sets a value obtained by subtracting 360°, which corresponds to one rotation of the steering wheel 11, from the computed steering angle $\theta_s$ as the first target steering angle $\theta_{s1}^*$ In addition, the reaction force control unit 27 temporarily stores the value of the steering angle $\theta_s$ as the initial position of the steering wheel 11.

When the value of the steering angle $\theta_s$ as the initial position is "−10°", for example, the first target steering angle $\theta_{s1}^*$ is "−370°". In step S101, the angle to be subtracted from the initial position of the steering wheel 11 is set based on the viewpoint of causing the second restriction member 42, which is movable, to reach the first restriction member 41, which is fixed, no matter what the initial position of the steering wheel 11 is. For example, the second restriction member 42 may be caused to reach a first restriction position P1, at which the second restriction member 42 abuts against the first restriction surface 41a of the first restriction member 41, from a second restriction position P2, at which the second restriction member 42 abuts against the second restriction surface 41b. Therefore, the angle to be subtracted from the initial position of the steering wheel 11 may not be 360°, and may be an angle that is equal to or more than the operation range of the steering wheel 11 which is determined by the stopper mechanism 40.

Next, the reaction force control unit 27 executes feedback control on the steering angle $\theta_s$ in order to cause the steering angle $\theta_s$ to follow the first target steering angle $\theta_{s1}^*$ (step S102). The reaction force control unit 27 determines whether the second restriction member 42, which rotates together with the steering wheel 11, has reached the first restriction position P1, at which the second restriction member 42 abuts against the first restriction surface 41a of the first restriction member 41 (step S103).

The reaction force control unit 27 determines that the second restriction member 42 has reached the first restriction position P1 when all of four conditions A1 to A4 are established.

$$I_a \leq I_{th} \tag{A1}$$

"$I_a$" is the absolute value of a current supplied to the reaction force motor 22. "$I_{th}$" is a current threshold value. The current threshold value $I_{th}$ is set based on the viewpoint of detecting an increase in the current of the reaction force motor 22 that accompanies an increase in the load on the reaction force motor 22 after the second restriction member 42 reaches the first restriction position P1.

$$T_h \leq T_{th} \tag{A2}$$

"$T_h$" is the steering torque. "$T_{th}$" is a torque threshold value, which is set based on the viewpoint of detecting a state in which the steering wheel 11 is not operated by the driver.

$$\omega \leq \omega_{th} \tag{A3}$$

"$\omega$" is the steering angular speed. "$\omega_{th}$" is an angular speed threshold value, which is set based on the viewpoint of detecting a state in which the steering wheel 11 is not operated by the driver.

$$t \geq t_{th} \tag{A4}$$

"t" is the time for which three conditions A1 to A3 are established. "$t_{th}$" is a time threshold value, which is set based on the viewpoint of suppressing an erroneous determination that the second restriction member 42 has reached the first restriction position P1 when the three conditions A1 to A3 are momentarily established, for example.

When it is determined that the second restriction member 42 has not reached the first restriction position P1 (NO in step S103), the reaction force control unit 27 proceeds to the process in step S102 described earlier. When it is determined that the second restriction member 42 has reached the first restriction position P1 (YES in step S103), the reaction force control unit 27 temporarily stores the amount of increase or decrease in the steering angle $\theta_s$ (or the difference between the initial position and the steering angle $\theta_s$) at that time as a first end angle $\theta_{end1}$ (step S104).

Figure 4A:
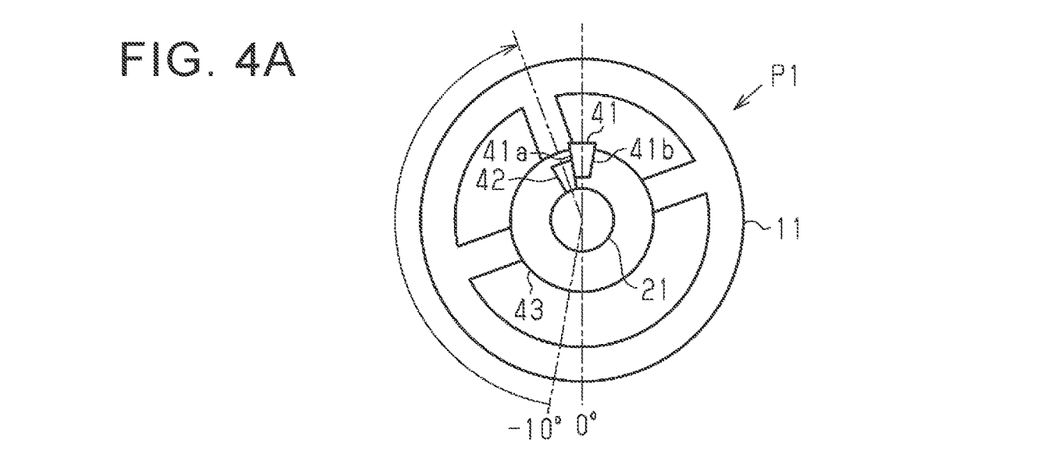
FIG. 4A is a back view illustrating the rotational position of the steering wheel during execution of the steering wheel reference point detection process according to the embodiment.

As illustrated in FIG. 4A, when the value of the steering angle $\theta_s$ as the initial position is "−10°", for example, the first end angle $\theta_{end1}$ is "−160°". This is because the operation range of the steering wheel 11 is limited to the range of ±170° with reference to the neutral position ($\theta_s$=0°) of the steering wheel 11 by the stopper mechanism 40. Here, the steering wheel 11 is rotated to a position at which "−170°" is reached from "−10°" as the start point (i.e. 0°), and therefore the reaction force control unit 27 recognizes the position at which rotation of the steering wheel 11 is restricted by the stopper mechanism as "−160°".

Next, the reaction force control unit 27 sets a second target steering angle $\theta_{s2}*$ in order to rotate the steering wheel 11 rightward (step S105). The reaction force control unit 27 sets a value obtained by adding 360°, which corresponds to one rotation of the steering wheel 11, to the steering angle $\theta_s$, which is stored as the initial position of the steering wheel 11, as the second target steering angle $\theta_{s2}*$.

When the value of the steering angle $\theta_s$ as the initial position is "−10°", for example, the second target steering angle $\theta_{s2}*$ is "350°". The angle to be added to the initial position of the steering wheel 11 in step S105 may not be 360°, as with the angle to be subtracted from the initial position of the steering wheel 11 in step S101 described earlier, and may be an angle that is equal to or more than the operation range of the steering wheel 11 which is determined by the stopper mechanism 40.

Next, the reaction force control unit 27 executes feedback control on the steering angle $\theta_s$ in order to cause the steering angle $\theta_s$ to follow the second target steering angle $\theta_{s2}*$ (step S106). Next, the reaction force control unit 27 determines whether the second restriction member 42, which rotates together with the steering wheel 11, has reached the second restriction position P2, at which the second restriction member 42 abuts against the second restriction surface 41b of the first restriction member 41 (step S107).

When it is determined that the second restriction member 42 has not reached the second restriction position P2 (NO in step S107), the reaction force control unit 27 proceeds to the process in step S106 described earlier. When it is determined that the second restriction member 42 has reached the second restriction position P2 (YES in step S107), the reaction force control unit 27 temporarily stores the amount of increase or decrease in the steering angle $\theta_s$ (or the difference between the initial position and the steering angle $\theta_s$) at that time as a second end angle $\theta_{end2}$ (step S108).

Figure 4B:
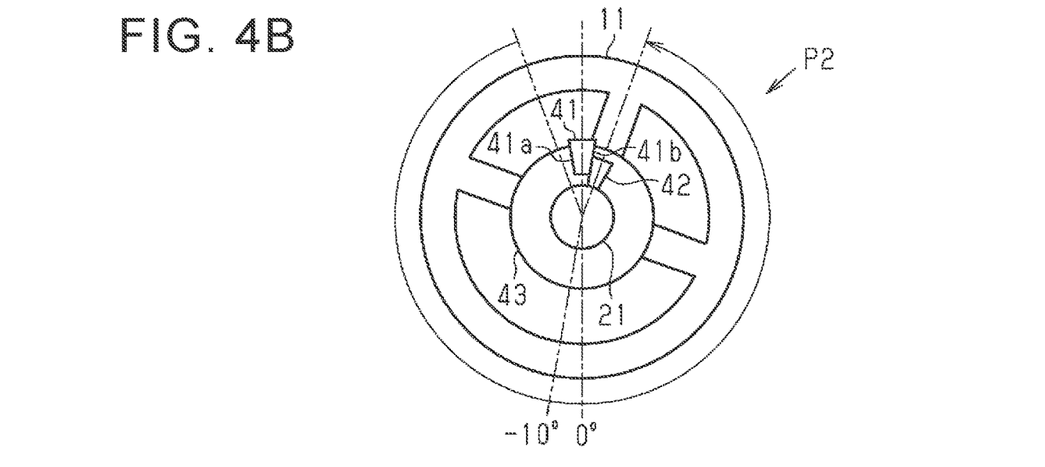
FIG. 4B is a back view illustrating the rotational position of the steering wheel during execution of the steering wheel reference point detection process according to the embodiment.

As illustrated in FIG. 4B, when the value of the steering angle $\theta_s$ as the initial position is "−10°", for example, the second end angle $\theta_{end2}$ is "180°". Here, the steering wheel 11 is rotated from "−170°" to "−10°", and thereafter rotated from "−10°" as the start point (i.e. 0°) to a position at which "170°" is reached. Therefore, the reaction force control unit 27 recognizes the position at which rotation of the steering wheel 11 is restricted by the stopper mechanism 40 as "180°" which is the actual amount of rotation of the steering wheel 11.

Next, the reaction force control unit 27 computes a midpoint $\theta_{s0}$ of the steering angle $\theta_s$ based on the first end angle $\theta_{end1}$ and the second end angle $\theta_{end2}$ which are stored in steps S104 and S108 described earlier (step S109). The reaction force control unit 27 calculates a value of half of the sum of the first end angle $\theta_{end1}$ and the second end angle $\theta_{end2}$ as the midpoint $\theta_{s0}$ of the steering angle $\theta_s$ as indicated by the following formula (B).

$$\theta_{s0} = (\theta_{end1} + \theta_{end2})/2 \tag{B}$$

When the value of the steering angle $\theta_s$ as the initial position is "−10°", for example, the first end angle $\theta_{end1}$ is "−160°", and the second end angle $\theta_{end2}$ is "180°". Therefore, the value of the midpoint $\theta_{s0}$ of the steering angle $\theta_s$ is "10°". The computed midpoint $\theta_{s0}$ of the steering angle $\theta_s$ corresponds to the motor midpoint which is the rotational angle $\theta_a$ of the reaction force motor 22 corresponding to the steering neutral position of the steering wheel 11.

The reaction force control unit 27 stores the midpoint $\theta_{s0}$ of the steering angle $\theta_s$, which is computed in step S109, and the motor midpoint, which corresponds to the midpoint $\theta_{s0}$ of the steering angle $\theta_s$, as the steering angle midpoint information (step S110).

Next, the reaction force control unit 27 computes a third target steering angle $\theta_{s3}*$ in order to move the steering wheel 11 to a position corresponding to the midpoint $\theta_{s0}$ of the steering angle $\theta_s$ (step S111). The reaction force control unit 27 sets the value of the midpoint $\theta_{s0}$ of the steering angle $\theta_s$, which is stored in step S110 described earlier, as the third target steering angle $\theta_{s3}*$.

Next, the reaction force control unit 27 executes feedback control on the steering angle $\theta_s$ in order to cause the steering angle $\theta_s$ to follow the third target steering angle $\theta_{s3}*$ (step S112). Next, the reaction force control unit 27 determines whether the steering angle $\theta_s$ coincides with the third target steering angle $\theta_{s3}*$ (step S113). When it is determined that the steering angle $\theta_s$ does not coincide with the third target steering angle $\theta_{s3}^*$ (NO in step S113), the reaction force control unit 27 proceeds to the process in step S112 described earlier. When it is determined that the steering angle $\theta_s$ coincides with the third target steering angle $\theta_{s3}^*$ (YES in step S113), the reaction force control unit 27 ends the process.

Figure 4C:
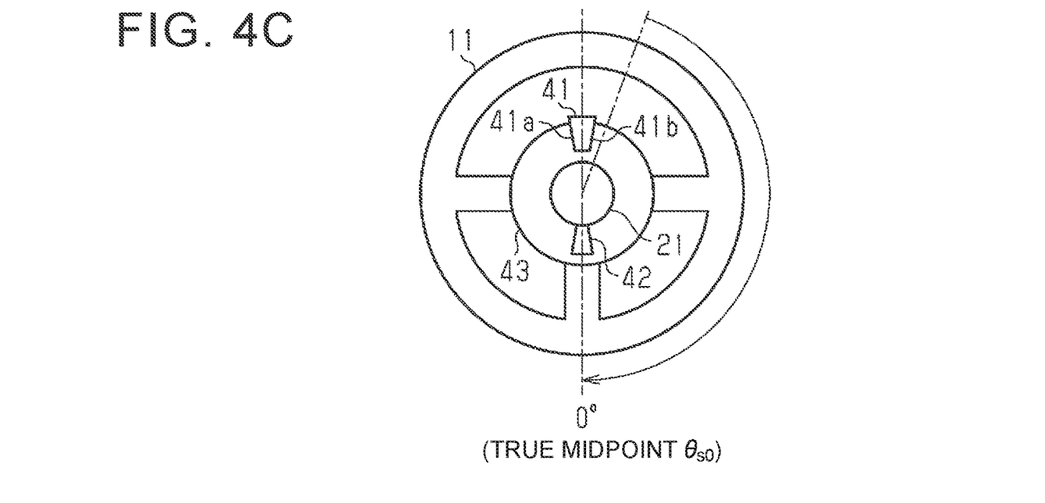
FIG. 4C is a back view illustrating the rotational position of the steering wheel during execution of the steering wheel reference point detection process according to the embodiment.

As illustrated in FIG. 4C, the rotational position of the steering wheel 11 reaches the true midpoint $\theta_{s0}$ of the steering angle $\theta_s$. The steering angle midpoint setting process is completed as described above.

After setting of the steering angle midpoint is completed, the reaction force control unit 27 executes synchronization control for the steered angle $\theta_w$ of the steered wheels 12. The synchronization control refers to control for causing the rotational position of the steering wheel 11 to match the steering position of the steered wheels 12. The reaction force control unit 27 acquires the rotational angle $\theta_p$ of the pinion shaft 34 through the steering control unit 36, and causes the reaction force motor 22 to operate such that the steering angle $\theta_s$ of the steering wheel 11 is brought to the rotational angle $\theta_p$ of the pinion shaft 34 matching a predetermined steering angle ratio, that is, an angle corresponding to the steered angle $\theta_w$ of the steered wheels 12. Since the positional relationship between the steering wheel 11 and the steered wheels 12 is maintained so as to match the predetermined steering angle ratio, the driver can steer the steering wheel 11 without feeling uncomfortable.

Effect of Embodiment

Thus, the following effects can be obtained with the present embodiment. When the determined conditions are established, the reaction force control unit 27 causes the steering wheel 11 to operate to a first operation end (a position corresponding to the first end angle $\theta_{end1}$) through control on the reaction force motor 22, and to thereafter operate in reverse to a second operation end (a position corresponding to the second end angle $\theta_{end2}$). After that, the neutral position of the steering wheel 11, that is, the midpoint $\theta_{s0}$ of the steering angle $\theta_s$, is computed based on the first end angle $\theta_{end1}$, which is the rotational angle of the reaction force motor 22 at the time of start of the reverse operation, and the second end angle $\theta_{end2}$, which is the rotational angle of the reaction force motor 22 at the time of end of the reverse operation. Therefore, the neutral position of the steering wheel 11 can be obtained when the determined conditions are established.

The determined conditions include a transition being made from a state in which a vehicle power source is lost to a state in which the vehicle power source is provided, and a power source switch of the vehicle being switched from off to on for a first time after the vehicle power source is provided. Therefore, the neutral position of the steering wheel 11 can be obtained before operation of the vehicle is started when a transition is made from a state in which the vehicle power source is lost to a state in which the vehicle power source is provided.

The reaction force control unit 27 sets the target steering angle $(\theta_{s1}^*, \theta_{s2}^*)$ for the steering wheel 11 to an angle that is equal to or more than the limit value (here, ±170° of the operation range of the steering wheel 11, which is determined by the stopper mechanism 40, when the steering wheel 11 is operated to the first operation end and when the steering wheel 11 is operated in reverse from the first operation end to the second operation end. Then, the reaction force control unit 27 controls the reaction force motor 22 so as to cause the steering angle $\theta_s$, which is computed based on the rotational angle $\theta_a$ of the reaction force motor 22, to follow the target steering angle $(\theta_{s1}^*, \theta_{s2}^*)$. Therefore, the steering wheel 11 can be operated to the first operation end and the second operation end more reliably.

In the so-called steer-by-wire steering device 10 in which the steering wheel 11 and the steered wheels 12, 12 are separated in terms of power transfer, the neutral position of the steering wheel 11 is computed by causing the reaction force unit 20 to operate. Therefore, it is not necessary to cause the entire vehicle system, including the steered wheels 12, 12, to operate in the steering angle midpoint setting process, unlike an electric power steering device (EPS) in which the steering wheel 11 and the steered wheels 12, 12 are not separated in terms of power transfer. Thus, the neutral position of the steering wheel 11 can be computed by generating smaller motor torque.

Other Embodiments

The present embodiment may be modified as follows. In the present embodiment, the steering angle $\theta_s$ which is computed based on the rotational angle $\theta_a$ of the reaction force motor 22 is used. When the steering device 10 is configured to have a steering angle sensor, however, the steering angle $\theta_s$ which is detected by the steering angle sensor may also be used.

In the present embodiment, the steering angle ratio is set to an appropriate value in accordance with the product specifications etc. The steering angle ratio may be "$\theta_s:\theta_w=1:1$", or may be "$\theta_s:\theta_w=1:3$", for example. When an informing device 28 is provided in a cabin, for example, as indicated by the long dashed double-short dashed line in FIG. 1, the reaction force control unit 27 may indicate the state of execution of the steering angle midpoint setting process through the informing device 28. For example, when a condition for starting execution of the steering angle midpoint setting process is established, the reaction force control unit 27 may indicate through the informing device 28 that execution of the steering angle midpoint setting process is started, and thereafter start execution of the steering angle midpoint setting process. In addition, the reaction force control unit 27 may indicate through the informing device 28 that the steering angle midpoint setting process is being executed during a period since execution of the steering angle midpoint setting process is started until such execution is completed. In addition, the reaction force control unit 27 may indicate through the informing device 28 that the steering angle midpoint setting process is completed when the steering angle midpoint setting process is completed. Examples of the informing operation by the informing device 28 include displaying a text message and issuing a voice message. In this way, the driver is informed visually or audibly through the informing device 28 that the steering wheel 11 is rotated because of execution of the steering angle midpoint setting process, even if the steering wheel 11 is rotated irrespective a steering operation by the driver as execution of the steering angle midpoint setting process is started. Therefore, an uncomfortable feeling given to the driver can be reduced.

In the present embodiment, the steering wheel 11 is rotated leftward and thereafter rotated rightward in the steering angle midpoint setting process. However, the steering wheel 11 may be rotated rightward and thereafter rotated leftward.

The reaction force control unit 27 may maintain the amount of rotation of the steering wheel 11 per unit time at a certain amount when the steering wheel 11 is rotated through execution of the steering angle midpoint setting process. In this way, abrupt rotation of the steering wheel 11 is suppressed, and therefore an uncomfortable feeling given to the driver can be reduced.

In the present embodiment, the operation range of the steering wheel 11 is limited by the stopper mechanism 40 to be less than one rotation at all times. However, the stopper mechanism 40 may be caused to function only when the steering angle midpoint setting process is executed. In this case, the first restriction member 41 is provided to be relatively movable with respect to the steering column 43, for example. Moreover, the first restriction member 41 is provided to be movable between an engagement position within the locus of rotation of the second restriction member 42 and a retracted position outside the locus of rotation of the second restriction member 42.

In the present embodiment, the steering angle midpoint setting process is executed when the power source switch is turned on for the first time after the battery is replaced. However, the steering angle midpoint setting process may be executed each time the power source switch is turned on, irrespective of whether battery replacement work is performed, for example.

In the present embodiment, the midpoint $\theta_{s0}$ of the steering angle $\theta_s$ corresponding to the neutral position of the steering wheel 11 is used as the reference point of operation of the reaction force unit 20. However, the steering angle $\theta_s$ corresponding to a position away from the neutral position of the steering wheel 11 may be used as the reference point of operation of the reaction force unit 20 as long as such a position can be correlated with the steered angle $\theta_w$ of the steered wheels 12.

In the present embodiment, the reaction force control unit 27 and the steering control unit 36 may be constituted as a single controller. In the present embodiment, a so-called linkless structure in which the steering shaft 21 and the steered wheels 12 are separated in terms of power transfer is adopted as the steering device 10 of a vehicle. However, a structure in which the steering shaft 21 and the steered wheels 12 are separable in terms of power transfer using a clutch may also be adopted. When the clutch is disengaged, power transfer between the steering wheel 11 and the steered wheels 12 is blocked. When the clutch is engaged, power transfer between the steering wheel 11 and the steered wheels 12 is allowed.

Other Technical Ideas

Next, a technical idea grasped from the present embodiment is additionally described below. The controller maintains the amount of rotation of the steering wheel per unit time at a certain amount when the steering wheel is rotated through execution of the first process and the second process. In this way, abrupt rotation of the steering wheel is suppressed. Therefore, an uncomfortable feeling given to the driver can be reduced.

What is claimed is:

1. A method for determining a steering angle that is a rotational angle of a steering wheel in a steer-by-wire steering device of a vehicle, the method for determining the steering angle comprising:
   rotating the steering wheel in a first direction;
   detecting a first load on a reaction force motor of the steer-by-wire steering device while rotating the steering wheel in the first direction;
   temporarily storing, when an increase in the first load on the reaction force motor is detected, a first end angle that is a first steering angle when the increase in the first load is detected when the steering wheel is rotated in the first direction;
   rotating the steering wheel in a second direction;
   detecting a second load on the reaction force motor of the steer-by-wire steering device while rotating the steering wheel in the second direction;
   temporarily storing, when an increase in the second load on the reaction force motor is detected, a second end angle that is a second steering angle when the increase in the second load is detected when the steering wheel is rotated in the second direction;
   determining the steering angle based on the first end angle and the second end angle.

2. The method according to claim 1, the method comprising causing, after determining the steering angle, a rotational angle of the steering wheel to match a steering position of a steered wheel of the vehicle, the steering position being a position corresponding to a steered shaft of the steer-by-wire steering device.

3. The method according to claim 2, wherein a rotational position of the steering wheel corresponding to the steering position of the steered wheel is caused to match the steering position in such a manner that the rotational position forms an angle in accordance with a predetermined steering angle ratio.

4. The method according to claim 1, wherein determining the steering angle includes calculating the steering angle based on an angle range that is obtained from the first end angle and the second end angle on an assumption that the first end angle and the second end angle are limited to an operation range of the steering wheel.

5. The method according to claim 1, wherein the steering wheel is rotated in the first direction and the second direction through control on the reaction force motor.

6. The method according to claim 1, wherein the detecting of the first load and the second load on the reaction force motor is performed through detection of a current supplied to the reaction force motor while the steering wheel is rotated in the first direction and the second direction through control on the reaction force motor.

7. The method according to claim 1, wherein the method comprising starting to rotate the steering wheel in the first direction after rotating the steering wheel is indicated through an informing device.

8. The method according to claim 1, wherein a rotational range of the steering wheel is within a range restricted by a stopper mechanism for providing a limit to the steering angle.

9. The method according to claim 1, wherein the first end angle and the second end angle are detected by a reaction force control unit for controlling the reaction force motor through a sensor that detects a state variable having a correlation with the rotational angle of the steering wheel.

10. The method according to claim 1, the method comprising determining the steering angle before operation of the vehicle is started.

11. The method according to claim 10, the method comprising
   determining that the operation of the vehicle has not been started yet when a determined condition is established, wherein
   the condition includes a power source switch of the vehicle being switched from off to on.

12. The method according to claim 1, the method comprising detecting a steering torque applied to a steering shaft through an operation to rotate the steering wheel while the steering wheel is rotated in the first direction and the second direction, wherein the temporarily storing of the first end angle and the second end angle includes setting, as a condition, detecting the increase in the first load and the second load on the reaction force motor and detecting a state in which the steering wheel is not operated by an operator based on the steering torque.

13. The method according to claim 12, wherein
the increase in the first load and the second load on the reaction force motor is detected when a current supplied to the reaction force motor is equal to or more than a current threshold value, and
the state in which the steering wheel is not operated by the operator is detected when the steering torque is equal to or less than a torque threshold value.

14. The method according to claim 1, the method comprising
detecting a steering torque applied to a steering shaft through an operation to rotate the steering wheel while the steering wheel is rotated in the first direction and the second direction, wherein
the temporarily storing of the first end angle and the second end angle includes setting, as a condition, detecting the increase in the first load and the second load on the reaction force motor, detecting a state in which the steering wheel is not operated by an operator based on the steering torque, and detecting a state in which the steering wheel is not operated by the operator based on a steering angular speed that indicates a change in the steering angle.

15. The method according to claim 14, wherein
the increase in the first load and the second load on the reaction force motor is detected when a current supplied to the reaction force motor is equal to or more than a current threshold value, and
the state in which the steering wheel is not operated by the operator is detected when the steering torque is equal to or less than a torque threshold value and the steering angular speed is equal to or less than an angular speed threshold value.

16. A method for determining a steering angle that is a rotational angle of a steering wheel in a steer-by-wire steering device of a vehicle, the method for determining the steering angle comprising:
rotating the steering wheel in a first direction while detecting a load on a reaction force motor of the steer-by-wire steering device until a first increase in the load on the reaction force motor is detected;
temporarily storing, when the first increase in the load on the reaction force motor is detected while the steering wheel is rotated in the first direction, a first end angle that is the steering angle when the first increase in the load is detected;
rotating the steering wheel in a second direction opposite to the first direction while detecting the load on the reaction force motor until a second increase in the load on the reaction force motor is detected; and
temporarily storing, when the second increase in the load on the reaction force motor is detected while the steering wheel is rotated in the second direction, a second end angle that is the steering angle when the second increase in the load is detected.

17. A controller for controlling a steer-by-wire steering device of a vehicle, wherein
the steer-by-wire steering device has a configuration in which a power transfer path between a reaction force unit to which a steering wheel is coupled and a steering unit configured to steer a steered wheel is separated,
the reaction force unit includes a reaction force motor that generates torque for rotating the steering wheel,
the controller is configured to execute a steering angle determining process of determining a steering angle that is a rotational angle of the steering wheel,
the steering angle determining process includes:
a process of rotating the steering wheel in a first direction;
a process of detecting a first load on the reaction force motor while rotating the steering wheel in the first direction;
a process of temporarily storing, when an increase in the first load on the reaction force motor is detected, a first end angle that is a first steering angle when the increase in the first load is detected when the steering wheel is rotated in the first direction;
a process of rotating the steering wheel in a second direction;
a process of detecting a second load on the reaction force motor while rotating the steering wheel in the second direction;
a process of temporarily storing, when an increase in the second load on the reaction force motor is detected, a second end angle that is a second steering angle when the increase in the second load is detected when the steering wheel is rotated in the second direction; and
a process of determining the steering angle based on the first end angle and the second end angle.

* * * * *